United States Patent

Priessnetz

[15] 3,683,412
[45] Aug. 8, 1972

[54] STYLUS AND MOUNTING FOR ELECTRIC DISCHARGE FACSIMILE RECORDER

[72] Inventor: Edmund F. Priessnetz, Baldwin, N.Y.

[73] Assignee: Electronic Transmission Systems, Inc., New York, N.Y.

[22] Filed: Oct. 3, 1969

[21] Appl. No.: 863,448

[52] U.S. Cl. .................................................. 346/139 A
[51] Int. Cl. ........................ G01d 15/16, G01d 15/18
[58] Field of Search ........... 346/139 A, 139 R, 139 C; 178/14, 87

[56] References Cited

UNITED STATES PATENTS

| | | |
|---|---|---|
| 2,719,775 | 10/1955 | Erving ........................ 346/139 |
| 2,723,897 | 11/1955 | Zabriskie .................... 346/139 |
| 2,770,517 | 11/1956 | Zabriskie ................ 346/139 X |
| 2,783,120 | 2/1957 | Zabriskie .................... 346/139 |
| 2,892,666 | 6/1959 | Parker et al. ............ 346/139 X |
| 2,978,288 | 4/1961 | Zabriskie et al. ........... 346/139 |
| 3,108,845 | 10/1963 | Zabriskie .................... 346/139 |

Primary Examiner—Richard B. Wilkinson
Assistant Examiner—John F. Gonzales
Attorney—Allison C. Collard

[57] ABSTRACT

A stylus for use in an electric discharge facsimile recorder having a mounting means adapted for connection to an endless belt. The mounting which holds the stylus also includes means for accurately adjusting its relative position with respect to the recording paper. The stylus is constructed from a metal alloy and includes a fine point for improved resolution and long life.

6 Claims, 5 Drawing Figures

3,683,412

PATENTED AUG 8 1972

INVENTOR
EDMUND F. PRIESSNETZ

BY

ATTORNEY

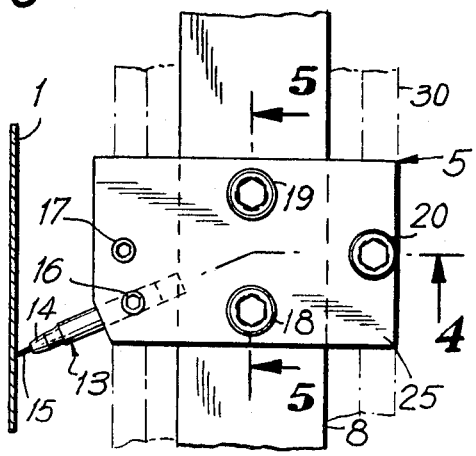
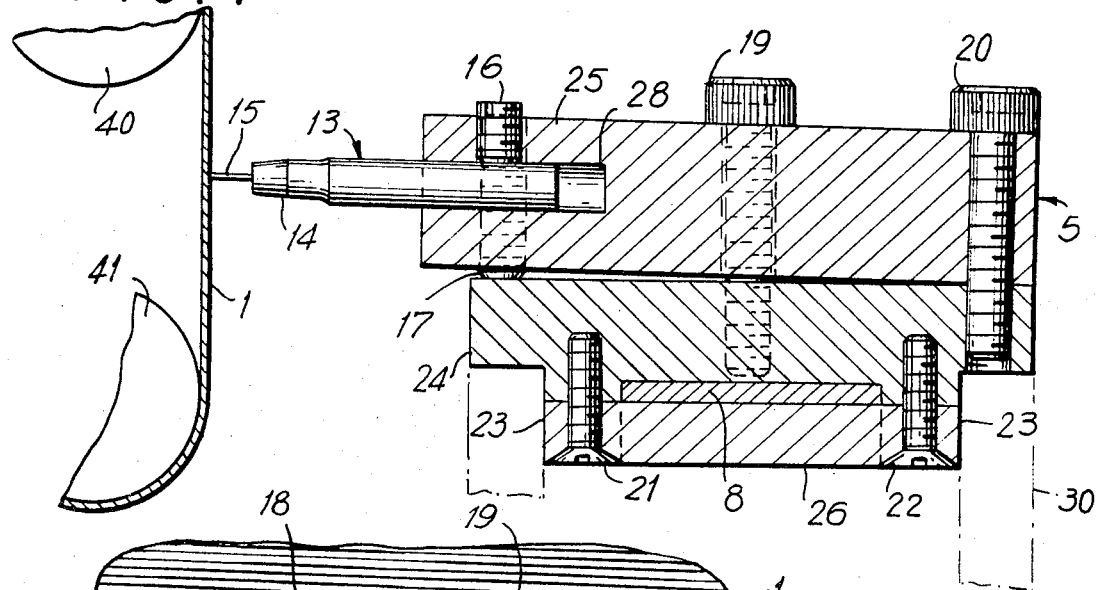
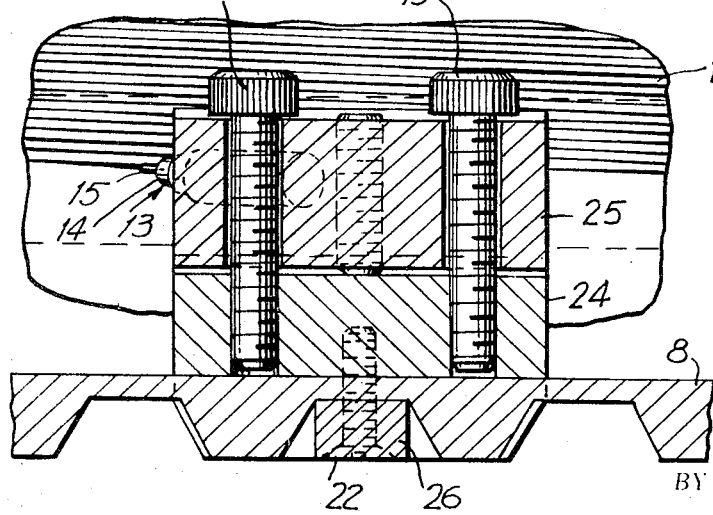

STYLUS AND MOUNTING FOR ELECTRIC DISCHARGE FACSIMILE RECORDER

This invention relates to dry electric discharge facsimile recorders, and more specifically to a stylus and mounting which is capable of being accurately positioned on an endless belt for contact with the recording paper of the apparatus.

Electric discharge facsmile recorders are well known in the art, and generally include a means for applying a modulated electrical signal to an electro-sensitive paper to cause a portion of the paper to be broken down and changed in contrast. The electrical modulated signal is usually applied between a metal stylus moving lightly over the coated surface of the electro-sensitive paper, and a metal platen or drum with which the back of the paper makes good contact.

The material most generally used for the stylus is fine drawn tungsten wire, approximately 0.010 inches in diameter. Tungsten, however, has several characteristics which reduce its desirability when used as an electrical stylus. The most serious of these is that tungsten tugnsten wire has a fibrous crystal structure so that as the stylus wears, the end of the wire become splintery and broom-like. The worn stylus thus tends to pick up portions of the insulated coating of the recording paper and thus becomes impacted with the insulation, or develops sharp edges which scratch or gorge the electro-sensitive surface of the paper and deteriorate the image. In order to compensate for the wear of a conventional type of stylus, it has heretofore been necessary to provide a stylus mounting which includes some means of advancing the stylus against the recording paper under constant pressure as the point becomes worn. Attempts to substitute other material for the tungsten wire utilized in the stylus have not heretofore resulted in any substantial success.

Accordingly, the present invention provides an improved stylus which is not constructed from tungsten wire, but an alloy of tungsten, namely thoriated tungsten. This alloy has improved strength and electrical characteristics which permit the point of the stylus to be ground to less than 0.010 inches so as to substantially improve the resolution of the recorder. Moreover, due to the improved electrical characteristics and hardness of the stylus, no appreciable wear takes place after substantial use so that no complex mounting device is required to compensate or adjust the stylus during its operation. The stylus mounting of a present invention includes a simple adjustment for vertically positioning the stylus with respect to the recording paper and a means for mounting the stylus onto an endless drive belt.

In order to improve the speed of recording on the recorder, it is customary to mount a plurality of stylii at equally spaced intervals on the endless drive belt so that one stylus is in contact with the electric recording paper at almost all times during the recording of information Each of the stylii mountings which are secured to the endless drive belt are therefore capable of accurately positioning the point of each stylus with respect to each other as they contact the recording paper. The result of having a plurality of stylii having a smaller than usual point moving across the recording paper is that the unrecorded space between successive excursions of each stylii can be greatly reduced so that the resolution of the recorded image can be greatly improved. Moreover, due to the fact that the diameter of the point of each stylus has been greatly reduced over conventional stylii, it is possible to reduce the amount of electrical power required to create the image on the recording paper. This reduction in electrical power required to produce the image makes the stylus of the present invention more readily adaptable for operation with transistorized and semi-conductor circuitry so as to permit considerable savings in cost, size, and weight of the recording apparatus.

It is therefore an object according to the present invention to provide an improved stylii constructed from a metal alloy for use in electric discharge facsimile recorders.

It is another object according to the present invention to provide an improved stylii for use in electrical discharge recorders which provides long life and better image resolution.

It is a further object according to the present invention to provide an improved stylii and mounting therefor for use on an endless drive belt which are simple in design, easy to construct, and reliable in operation.

Other objects and features according to the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views:

FIG. 3 is a top-plan view of one stylus and mounting of the apparatus of FIG. 1; FIG. 4 is a cross-sectional view taken along section 4—4 of FIG. 3; and FIG. 5 is a cross-sectional view taken along section 5—5 of FIG. 3.

Figure 1:
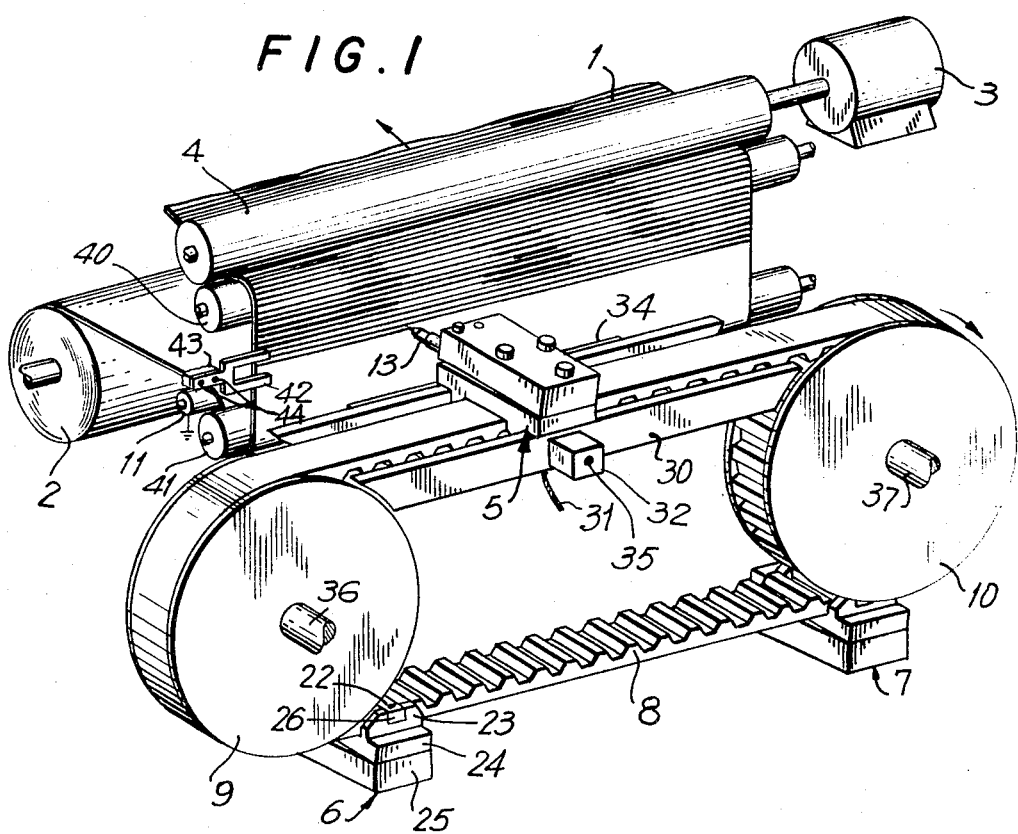
FIG. 1 is a simplified perspective view of a portion of the recorder illustrating the inventive stylii and mountings according to the invention.
Figure 2:
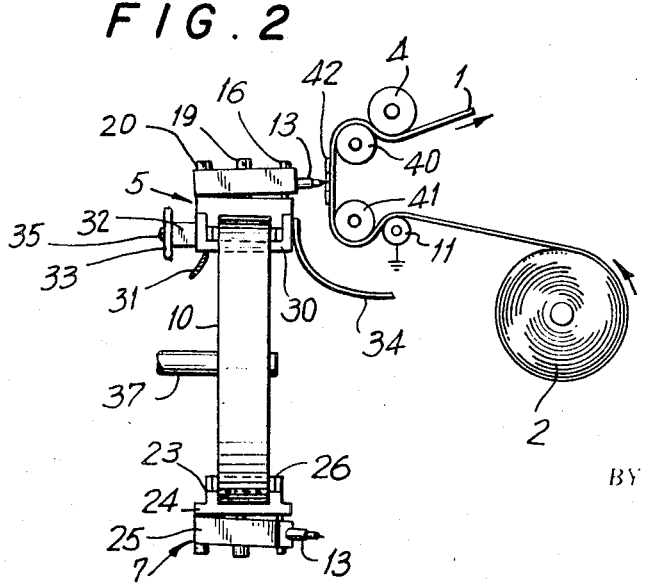
FIG. 2 is a side view of FIG 1.

Referring to FIGS. 1—5 there is shown a simplified view of an electric discharged facsimile recorder utilizing the stylii and mounting in accordance with the present invention. A record sheet 1, supplied from roll 2 is slowly drawn past the marking area by means of drive roller 4 which is driven by a suitable means, such as motor 3. An idler roller 40 pivotably disposed below drive roller 4 urges the record sheet against drive roller 4. Disposed below the marking area is an additional idler roller 41 which serves to maintain a substantially flat and vertical positioning of record sheet 1 across the marking area. Adjacent to roller 41 is pivotably mounted a grounding roller 11 which is electrically connected to ground potential. A paper guide 34 is disposed below rollers 11 and 41 to serve as a guide in directing recording paper 1 from roll 2 into the marking area when the paper is initially threaded through the facsimile apparatus. Supply roll 2 may be provided with a frictional drag in order to maintain reasonable tension to the web of record sheet 1. Roll 2 may consist of any commercially available electrosensitive paper which provides a contrasting image visible on its surface in response to an electrical current which is passed between the point of stylii 13 and roller 11. Stylii 13 are carried by mountings 5, 6 and 7 which are equally spaced apart and secured to a cleated belt 8 which in turn is driven by correspondingly toothed drive rollers 9 and 10 pivotably mounted on shafts 36 and 37. As each stylus 13 moves across the marking area between rollers 40 and 41, its mounting electrically engages conductive guide rail 30 which longitudinally extends across the width of recording paper 1. While the outer conductive surface of recording paper 1 is in electrical contact with guide roller 11, the remaining portion of the electrical circuit is connected to conductor 31 on guide rail 30, so that contact of stylii 13 against the surface of recording paper 1 completes the electrical circuit required to product an image on the recording paper. Conductor 31 is connected to a source of modulated recording signal so that the conductive surface of record sheet 1 can be electrically burned away by the recording discharge. Conductive rail 30 is supported on the facsimile transmitter housing 33 by means of insulator 32 secured thereto by means of bolt 35.

A paper edge positioning device 42, which is secured by means of fasteners 44 to housing segment 43 is in contact with the leading edge of record paper 1 in the marking area. Positioning device 42 includes a horizontally directed slot, shown slightly enlarged in FIG. 1, in order to permit each of stylii 13 to slidably pass through the slot as they come into contact with the leading edge of record paper 1. Positioning device 42 serves to prevent the sharp point of stylii 13 from tearing the leading edge of record paper 1. The use of positioning device 42 has resulted in a significant improvement over conventional facsimile transmitters in eliminating destruction of the record paper by stylii 13.

Referring in detail to FIGS. 3, 4 and 5, there are shown cross-sectional views of the stylus and its mounting secured on endless belt 8. Mounting 5 includes an upper portion 25 which serves as a top supporting member for stylus 13. On one end of upper portion 25 is a flattened corner which includes a cylindrical bore 28 for receiving the body of stylus 13. A set screw 16 is threadably inserted through the top surface of portion 25 so as to engage and lock the body of stylus 13 within cylindrical bore 28. Stylus 13, which is preferably constructed from a tungsten alloy, such as thoriated tungsten, includes a tapered portion 14 and a fine needle point 15 for electrical engagement to recording paper 1. In order to vertically position point 15 of stylus 13 on recording paper 1, an elevation screw 17, which is threadably engaged through upper portion 25, contacts the top surface of lower portion 24 of mounting 5. Rotation of screw 17 permits point 15 to be adjusted in elevation so that it will be properly aligned on recording paper 1 with respect to the of the two stylii. After point 15 of stylus 13 had been properly adjusted, mounting screws 18, 19, and 20 which slidably fit through upper portion 25 and are threadably engaged to lower portion 24, may be tightened to secure the adjustment made by screws 17. With this particular design of mounting 5, it has been found that the adjustment of stylus point 15 does not change after mounting screws 18, 19, and 20 are tightened since the tendency of point 15 to slip downward after mounting screws 18, 19, and 20 are tightened, is offset by a slight bending of upper portion 25 so as to return point 15 to its original adjusted position. A clamping means is provided along the bottom surface of portion 24 for clamping the upper and lower portions to the cleated endless belt 8. The clamp consist of a pair of parallel spaced-apart flanges 23 which are integrally formed along the bottom surface of portion 24. The flanges include centrally located notch cutouts into which a cross bar 26 is received. The endless belt 8 is disposed between the lower portion of the mounting and the cross bar which is secured in the mounting in the notch cutouts by bolts 21 and 22.

In an actual embodiment of the electric discharge recorder, cleated belt 8 was driven at 180 rpm so that the stylii 5, 6, and 7 are fed across the surface of the recording paper at approximately 30 inches per second. Each stylus is constructed from a thoriated tungsten rod approximately 0.5 inches long and having a diameter of 0.125 inches. The first reduction in diameter i4 leading to point 15 of the stylus is approximately 0.090 inches, and point 15 which is formed on a centerless grinder is 0.0098 inches in diameter. The point is 0.090 inches in length and rounded at it end.

While only a few embodiments of the present invention have been shown and described, it will be understood that many changes and modifications may be made thereunto without departing form the spirit and scope of the invention.

What is claimed is:

1. A stylus and mounting for electric discharge recorders and the like, comprising;
    an upper portion;
    a cylindrical bore disposed within one end of said upper portion;
    a set screw threadably engaged to said upper portion for engagement with said stylus within said bore, for securing the stylus to said upper potion;
    a rigid lower portion disposed below said upper portion;
    an adjusting screw threadably engaged through the body of said upper portion an in contact with the top surface of said lower portion, for elevating said upper portion with respect to said lower portion; and
    at least two mounting screws disposed through said upper portion threadably engaged to said lower portion and spaced apart from said adjusting screw, for securing said upper portion to said lower portion.

2. The mounting as recited in claim 1 additionally comprising clamping means disposed along the bottom surface of said lower portion for clamping said upper and lower portions to a cleated endless belt.

3. The mounting as recited in claim 2 wherein said clamping means comprises a pair of parallel spaced-apart flanges integrally formed along the bottom surface of said lower portion, said flanges including centrally located notched cutouts, and a cross bar disposed within said notched cutouts, and means for securing said cross bar within the notched cutouts of said flanges.

4. The mounting as recited in claim 3 wherein said means for securing said cross bar comprises screws disposed through said cross bar and threadably engaged to each of said flanges of said lower portion.

5. The stylus and mounting as recited in claim 1 wherein said stylus comprises a thoriated tungsten rod having a body portion, and an integrally formed point disposed on one end for contact with electric discharge recording paper.

6. The mounting as recited in claim 5 additionally comprising a positioning device disposed in contact with the leading edge of the recording paper, said positioning device including a slot for receiving the point of the stylus.

* * * * *